(12) United States Patent
Schumann (10) Patent No.: US 6,308,425 B1
(45) Date of Patent: Oct. 30, 2001

(54) TOOL CLAMPING MECHANISM FOR A POWER TOOL

(75) Inventor: Matt Schumann, Cambridge (GB)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/101,647

(22) PCT Filed: Feb. 5, 1998

(86) PCT No.: PCT/EP98/00624

§ 371 Date: Jul. 14, 1998

§ 102(e) Date: Jul. 14, 1998

(87) PCT Pub. No.: WO98/38000

PCT Pub. Date: Sep. 3, 1998

(30) Foreign Application Priority Data

Feb. 28, 1997 (GB) .................................................. 9704255

(51) Int. Cl.[7] .................................................. B23D 49/00
(52) U.S. Cl. ................................... 30/392; 83/699.21
(58) Field of Search ........................... 20/392, 393, 394; 279/90, 89; 83/699.21; 403/348, 349

(56) References Cited

U.S. PATENT DOCUMENTS

| | | | |
|---|---|---|---|
| 2,617,166 | * | 11/1952 | Kaufmann .............................. 24/597 |
| 4,528,753 | * | 7/1985 | Kuhlmann et al. ..................... 30/392 |
| 5,306,025 | * | 4/1994 | Langhoff ................................. 279/90 |
| 5,433,457 | * | 7/1995 | Wright ................................ 30/392 X |
| 5,634,277 | * | 6/1997 | Wada et al. ........................ 83/699.21 |

FOREIGN PATENT DOCUMENTS 0 623 413 a1   11/1994   (EP) .
0 544 129 B1    1/1995   (EP) .

* cited by examiner

*Primary Examiner*—M. Rachuba
*Assistant Examiner*—Dominic Troiano
(74) *Attorney, Agent, or Firm*—Michael J. Striker (57) ABSTRACT

A clamping mechanism for a power tool which has a bayonet washer rotatably mounted on the end of a plunger so that the bayonet washer is rotatable between an open and a closed position. The bayonet washer is biassed towards the closed position by a torsion spring, but is latched in the open position when no operating member is positioned in the clamping mechanism. When an operating member is inserted into the mechanism through a slot in the bayonet washer and into engagement with the plunger, the washer is automatically released from the open position and rotates under the biassing force of the torsion spring to the closed position whereupon the operating member is locked into the power tool.

13 Claims, 8 Drawing Sheets

TOOL CLAMPING MECHANISM FOR A POWER TOOL

BACKGROUND OF THE INVENTION

The present invention relates to a clamping mechanism for power tools.

EP 0623413 A1 discloses a blade clamping mechanism for a power tool in which a rotating collar forces two balls inwards to hold ears formed on the saw blade, but this has the disadvantage that the blade is not automatically centralised. There is further disclosed in EP 0544129 B1 a blade clamping mechanism in which a rotating collar engages with a screw thread on the outside of a plunger, pulling ears formed on the saw blade up into Ve notches cut into the bottom of the plunger. This mechanism automatically centralises the blade, but has the disadvantage that it does not latch in the open position when no blade is present.

SUMMARY OF THE INVENTION

According to an embodiment of the invention at present preferred, there is provided a power tool having a clamping mechanism for a removable operating member, the clamping mechanism including a locking member which is rotatable about an axis parallel to the insertion direction of the operating member between an open position in which the operating member may be inserted into the tool and a closed position in which removal of the operating member is prevented, and means for latching the locking member in the open position when no operating member is present. In the case of a jig saw, the operating member would usually be a saw blade.

The power tool of the above described embodiment has the advantage that the clamping mechanism remains in the open configuration when no operating member is present and is ready to receive a new operating member which can be simply pushed in. The user does not, therefore, need to hold a button or switch whilst inserting the operating member as is necessary with presently known mechanisms. As will become clear from the following, the operating member may be removed from the mechanism by the user rotating the locking member to its open rotational position whereupon the operating member simply drops out of the mechanism. This has the advantage that the user has only to make a small movement to release the operating member from the clamping mechanism.

In a development of the invention, the latching means comprise at least one projection movable in the direction opposite to the insertion direction to engage one or more cooperating recesses in the locking member. The locking member is preferably carried on a plunger extending from the tool and the latching means is preferably formed on a keeper which is slidably mounted in the plunger. Each projection may be in the form at least one leg extending from the bottom of the keeper towards the locking member. The keeper is also advantageously biassed towards the locking member, preferably by a compression spring.

One or more v-shaped grooves may be formed in the keeper for guiding the operating member and additionally, the plunger could have at least one v-shaped groove for receiving a corresponding projection on the operating member. The locking member advantageously comprises a washer through which the operating member may be inserted, preferably having at least one slot for receiving a projection on the operating member whereby the operating member is captured on rotation of the washer. In one embodiment, at least one, and preferably two cam surfaces or ramps are formed on the washer for driving the operating member into the tool on rotation of the washer by engagement with the or each projection on the operating member. In the case of two cam surfaces, it is advantageous for each cam surface to engage its associated projection at a different angular position of the washer, so that the force necessary to rotate the washer is reduced. The locking member is additionally biassed towards its closed position, for example by the action of a torsion spring.

According to another aspect of the present invention there is provided a power tool having a clamping mechanism for a removable operating member including a plunger extending from the tool for receiving the operating member having one or more V-shaped notches for receiving a corresponding projection on the operating member and means for driving the operating member into the tool to centre the projection(s) in the notch(es) to centre the operating member.

The driving means preferably comprise a rotatable member having one or more cam surfaces for engaging the projections on the operating member.

BRIEF DESCRIPTION OF THE DRAWINGS

In order that the presently preferred embodiment may be well understood, it will now be described in greater detail, by way of example, reference being made to the accompanying drawings, in which.

DETAILED DESCRIPTION OF THE PREFERRED EMBODIMENT

The drawings show a jigsaw power tool 40 having a clamping mechanism for securely holding saw blades in a central position whatever their thickness (designed for range 0.8 mm to 2.0 mm thick).

Figure 1:
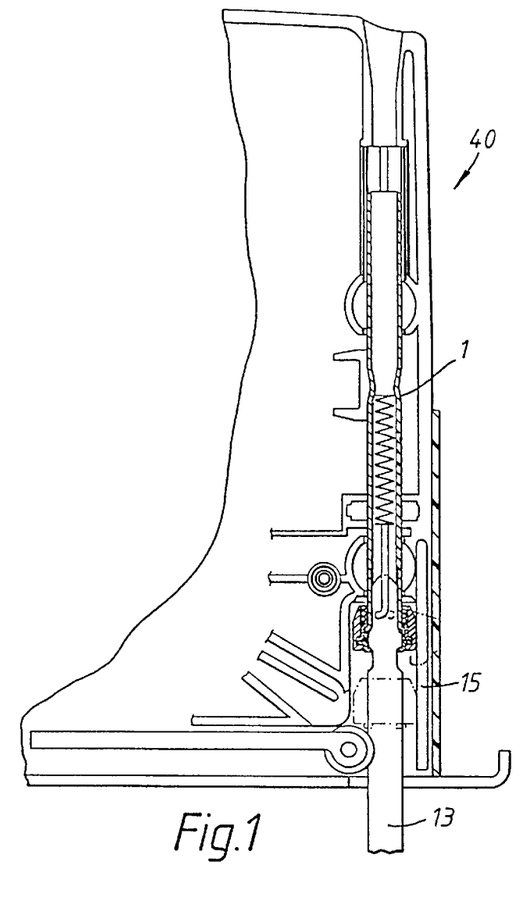
FIG. 1 is a side view, in partial section, of a jigsaw having a clamping mechanism of the invention.
Figure 2:
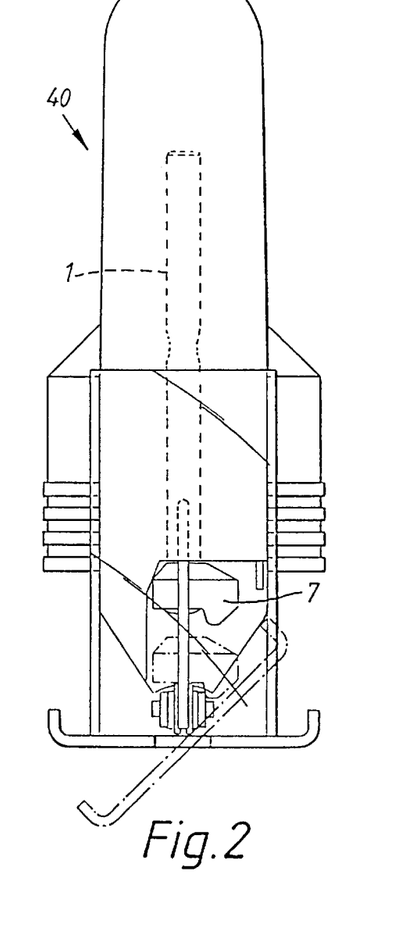
FIG. 2 is a front view, in partial section, of the jigsaw of FIG. 1.
Figure 3:
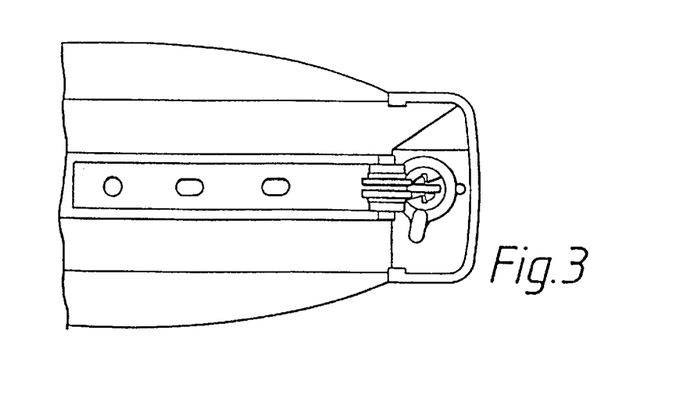
FIG. 3 is a bottom view, in partial section, of the jigsaw of FIG. 1.
Figure 4:
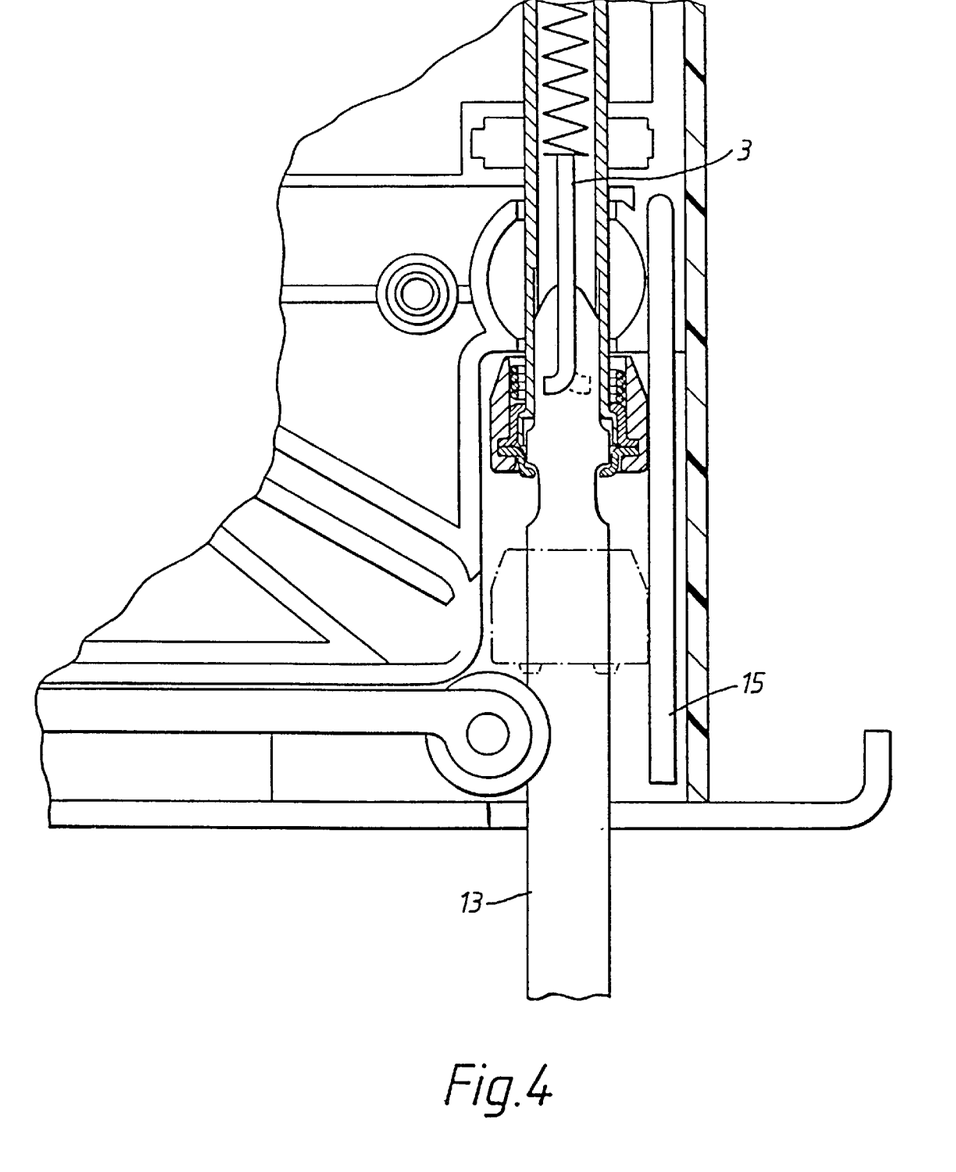
FIG. 4 is an enlarged view of the clamping mechanism part of the jigsaw of FIG. 1.
Figure 5:
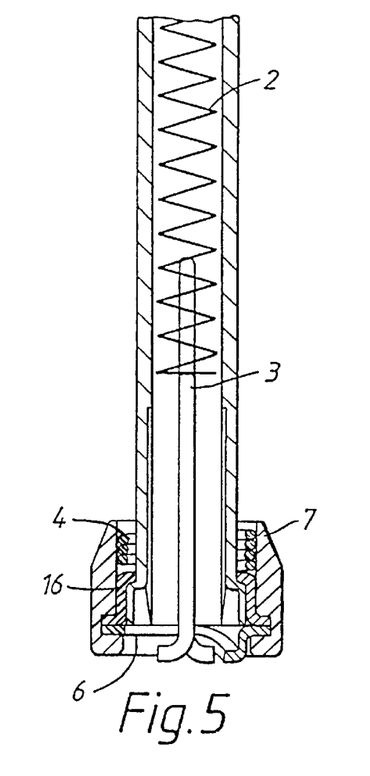
FIG. 5 is a sectional side view of the clamping mechanism of the invention in the open configuration.
Figure 6:
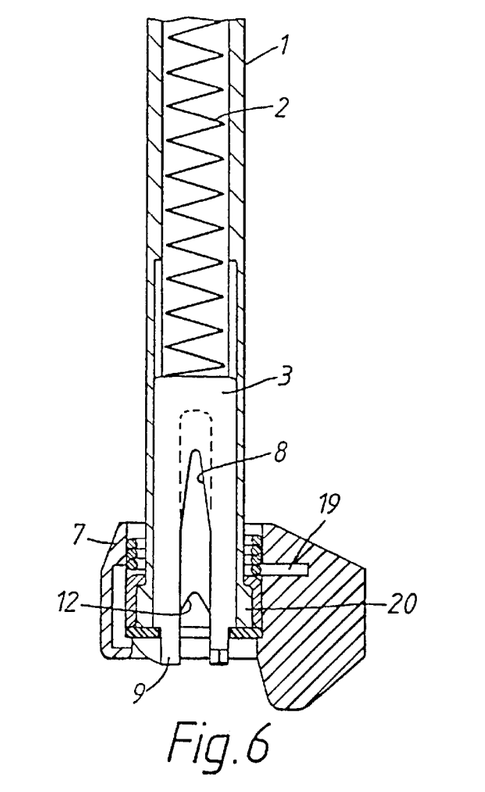
FIG. 6 is a sectional front view of the mechanism of FIG. 5.
Figure 7:
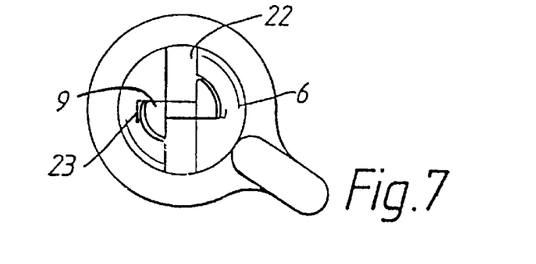
FIG. 7 is a bottom view of the clamping mechanism in its open configuration.
Figure 8:
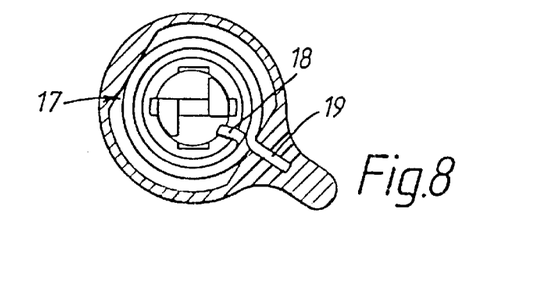
FIG. 8 is sectional bottom view of the clamping mechanism in its open configuration.
Figure 9:
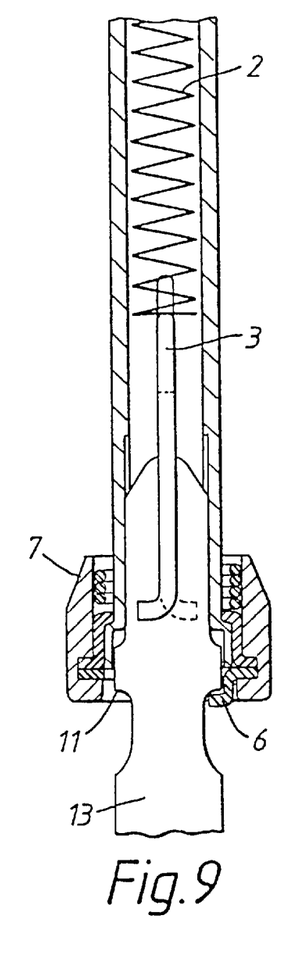
FIG. 9 is a sectional side view of the clamping mechanism in its closed configuration.
Figure 10:
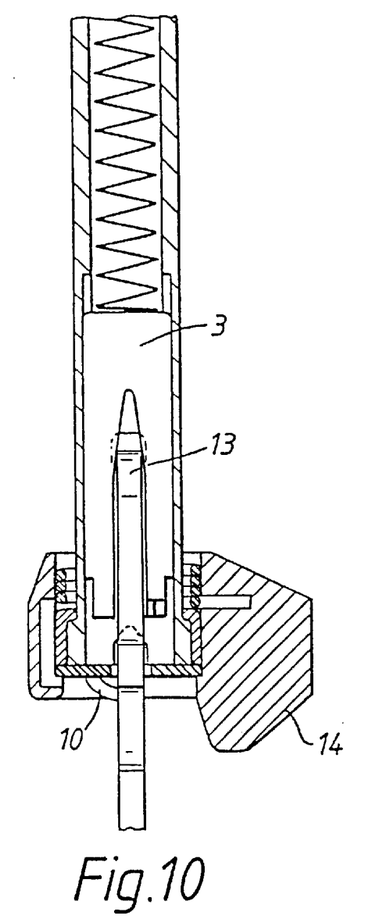
FIG. 10 is a sectional front view of the clamping mechanism in its closed configuration.
Figure 11:
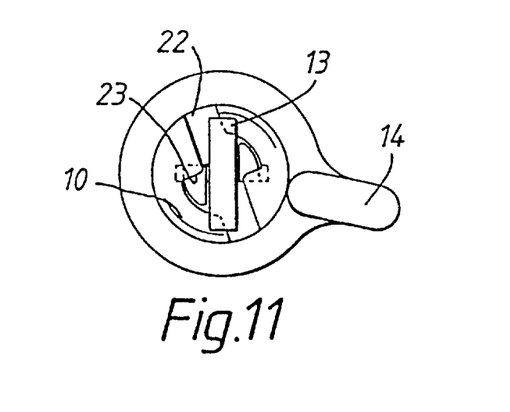
FIG. 11 is a bottom view of the clamping mechanism in its closed configuration.
Figure 12:
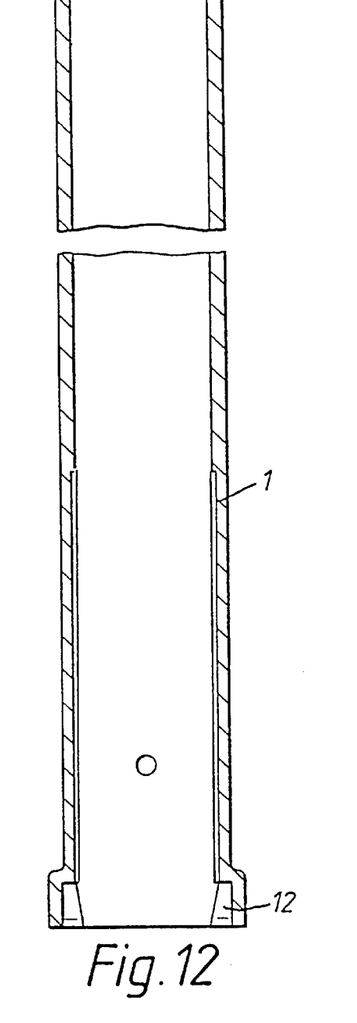
FIG. 12 is sectional front view of a plunger which forms part of the clamping mechanism.
Figure 13:
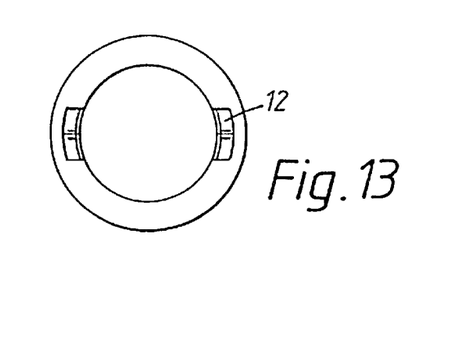
FIG. 13 is a bottom view of the plunger of FIG. 12.
Figure 14:
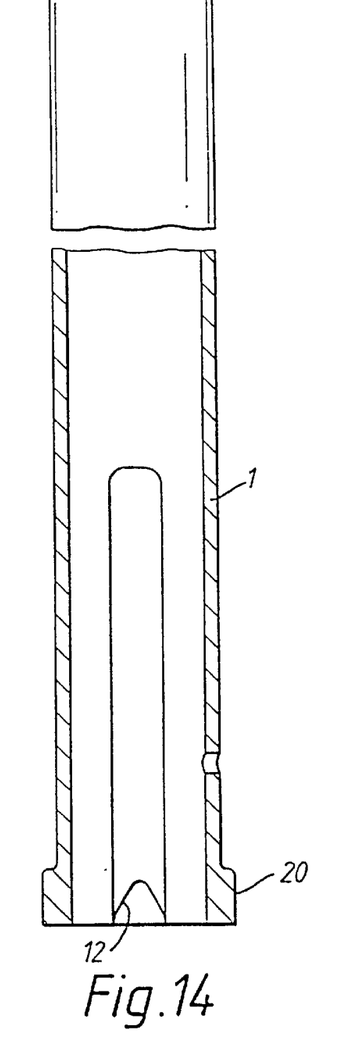
FIG. 14 is a sectional side view of the plunger of FIG. 12.
Figure 15:
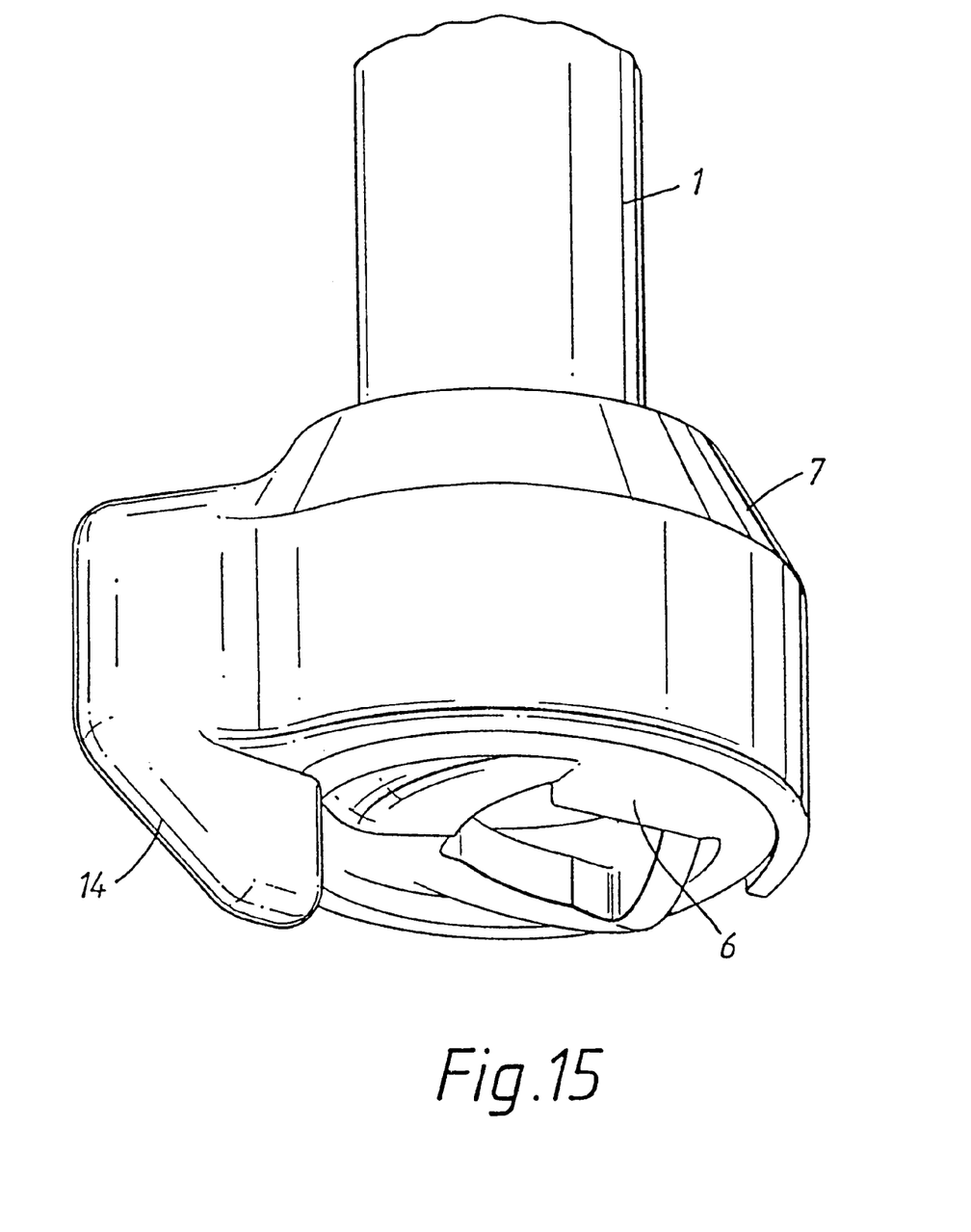
FIG. 15 is a perspective view of part of the clamping mechanism.
Figure 16:
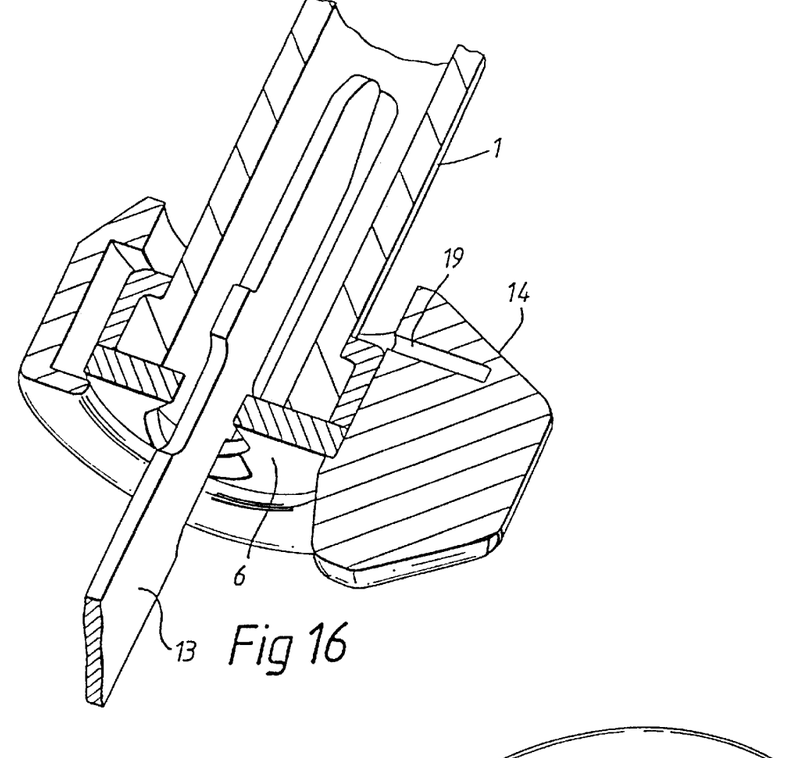
FIG. 16 is a sectional view of the part of clamping mechanism shown in FIG. 15.
Figure 17:
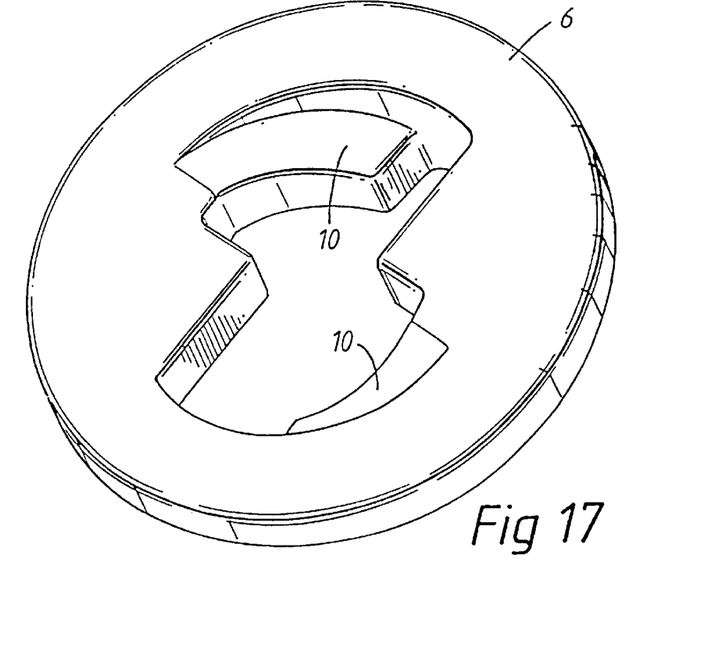
FIG. 17 is a perspective view of from above of a bayonet washer which forms part of the clamping mechanism of the invention.
Figure 18:
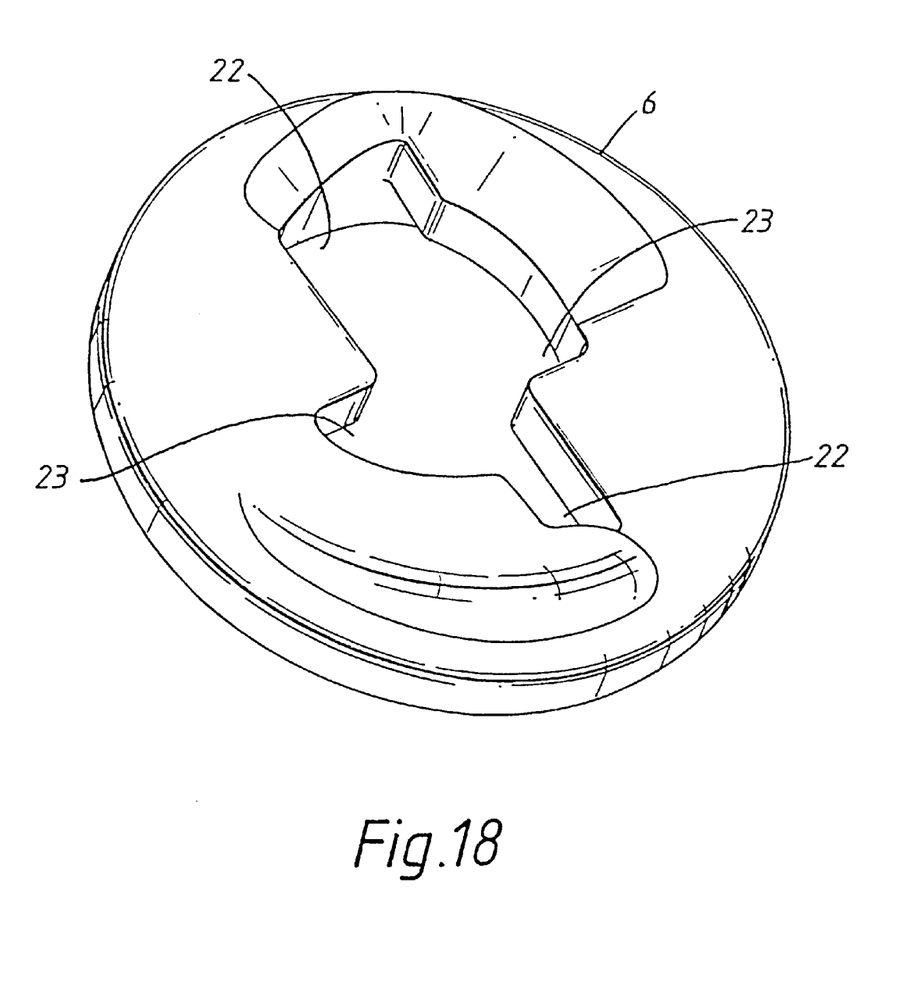
FIG. 18 is a perspective view of from below of the bayonet washer of FIG. 17.

The clamping mechanism comprises a cup 16 which is fixed to a bayonet washer 6 (shown in more detail in FIGS. 17 and 18) by welding or crimping to form a combined cup/bayonet washer assembly 17. The cup/bayonet washer assembly 17 is rotatably mounted on a larger diameter part 20 of a plunger 1, which prevents the bayonet washer 6 moving up or down the axis of the plunger 1, and a collar 7 is positioned around the cup/bayonet washer assembly 17. The collar 7 is located axially by a flange and engages with a locating feature, such as flats, formed on the cup/bayonet washer assembly 17 so as to be rotationally fast therewith. A torsion spring 4 is located at one end in a hole 18 in the plunger 1, and at the other end 19 within an actuating wing 14 formed on the collar 7, so that torque is transferred from plunger 1 via the spring 4 and collar 7 to the bayonet washer 6.

A keeper part 3 mounted within the plunger 1 engages with vertical grooves in the plunger 1 which allow movement of the keeper 3 along the axis of the plunger 1 but prevent rotational movement of the keeper 3 within the plunger. The keeper 3 has formed on its lower end a pair of legs 9 which line up with cut-outs 23 in the bayonet washer 6 when the bayonet washer is in its open position. A compression spring 2, also located within the plunger 1 above the keeper 3, presses against the upper end of the keeper 3 to bias the legs 9 downwards towards the bayonet washer 6.

In addition to the diametrically opposed cutouts 23, the bayonet washer 6 has a slot 22 extending across its diameter, substantially perpendicular to the position of the cutouts 23. The upper surface of the bayonet washer 6 has a pair of ramps or cam surfaces 10 which end at the slots 22.

The clamping mechanism operates thus:

Initially the mechanism is in its open configuration, as shown in FIGS. 5 to 8, the keeper 3 being in its lower most position with the legs 9 engaged in the cut-outs in the bayonet washer 6 so that the washer 6 is locked open against the force of the torsional spring 4. To clamp a saw blade 13 in place within the mechanism, the user simply pushes the new blade 13 up into the open slot 22 visible in the bayonet washer 6 until it can go no further. During this movement, the top of the saw blade 13 firstly passes through the bayonet washer 6, and is guided into a vee 8 in the keeper 3 until it is held central in the keeper 3 and jams. Regardless of the thickness of the blade 13, its width should be a close clearance fit in the plunger 1. Further upwards motion of the blade 13 slides the keeper 3 up the vertical grooves in the plunger 1, compressing the compression spring 2 which acts on the upper end of the keeper 3 to bias it into its lower position.

As the keeper 3 slides upwards away from the bayonet washer 6, the legs 9 formed on the lower end of the keeper 3 disengage from the cut-outs 23 in the bayonet washer 6, the bayonet washer 6 is released, and the torsion spring 4 rotates the bayonet washer 6 anti-clockwise (viewed from below). At some point, depending on the thickness of the blade, the ramps 10 of the bayonet washer 6 capture ears 11 formed on the sides of the saw blade 13, and urge them upwards until they jam in vee notches 12 in the base of the plunger 1. At this point the bayonet washer 6 is jammed and the saw blade 13 is centered. The clamping mechanism is now "closed".

To release the saw blade 13, the user simply pushes on the "wing" 14 of the collar 7, rotating it clockwise (viewed from below). During this movement, the ramps 10 of the bayonet washer 6 release the "ears" 11 of the saw blade 13, so that the saw blade 13 is free to be ejected by the keeper 3 which is pushed down by the compression spring 2 towards the bayonet washer 6.

Further rotation of the collar 7 enables the legs 9 of the keeper 3 to engage in the cut-outs 23 of the bayonet washer 6, latching the clamping mechanism in the open position, after which the wing 14 touches the back wall 21 of the housing of the jigsaw.

Should the user omit to further rotate the collar 7 so as to latch the mechanism in the open position and instead release the collar 7 prematurely, the collar will simply spring back (anti-clockwise) until it is stopped by a finger guard 15. In this instance the keeper is prevented from falling out by its legs 9 being stopped by the top face of the bayonet washer 6. The clamping mechanism can then be reset simply by pushing the collar 7 (clockwise) until it latches in the open position.

Once in the open position, the clamping mechanism is ready to receive another saw blade.

The mechanism described above has a number of advantages over other mechanisms including the mechanisms described in the two patents mentioned above:

1. It is "one-touch", that is, the user pushes the collar once to release the blade, and then it remains open, ready to receive a new blade which can be simply pushed in. The user does not need to push the collar a second time or to hold the collar open to insert the blade, as is necessary on many existing mechanisms.

2. The user has only to make a small movement to open the mechanism, and so it is very quick to use. One existing mechanism requires several turns to open and close the mechanism. Other saws which use screws or bolts to clamp the saw blades also require several turns, and thus are slow to use.

3. The angle of the vee notches in the base of the plunger and the angles of the ramp inclines in the bayonet washer are designed so that during blade insertion, once the "ears" of the saw blade have been captured by the ramps of the rotating bayonet washer, the saw blade ears will automatically be pulled in and centred in the plunger vee notches.

4. Because of slight radial clearances between the cup and plunger, when then mechanism is opened, first one ramp will lift microscopically clear of one saw blade ear, followed immediately by the other. This has the effect of reducing the peak force required to push at the "wing" of the collar, and is a design feature.

What is claimed is:

1. A power tool comprising a clamping mechanism for a removable operating member, the clamping mechanism including a locking member which is rotatable between an open position in which the operating member may be inserted into the tool and a closed position in which removal of the operating member is prevented; and means for latching the locking member in the open position when no operating member is present, said locking member having at least one recess and being rotatable about an axis parallel to an insertion direction of the operating member, wherein the latching means includes at least one projection movable in a direction opposite to the insertion direction to engage said at least one recess in the locking member.

2. A power tool as claimed in claim 1, and further comprising a plunger extending from the power tool, and a keeper slidably mounted in the plunger, wherein the locking member is carried on the plunger and the latching means is formed on the keeper.

3. A power tool as claimed in claim 2 including means for biassing the keeper towards the locking member.

4. A power tool as claimed in claim 2 in which the keeper has one or more V-shaped grooves for guiding the operating member.

5. A power tool as claimed in claim 2 in which the plunger has one or more V-shaped grooves for receiving a corresponding projection on the operating member.

6. A power tool as claimed in claim 1 including means for biassing the locking member towards the closed position.

7. A power tool as claimed in claim 1, and further comprising a plunger extending from the tool for receiving the operating member and having one or more V-shaped notches for receiving a corresponding projection on the operating member, and means for driving the operating member into the tool to center the projections in the corresponding notches to center the operating member.

8. A power tool as claimed in claim 7 in which the driving means comprise a rotatable member having one or more cam surfaces for engaging the projections on the operating member.

9. A power tool comprising a clamping mechanism for a removable operating member, the clamping mechanism including a locking member which is rotatable between an open position in which the operating member may be inserted into the tool and a closed position in which removal of the operating member is prevented; and means for latching the locking member in the open position when no operating member is present, wherein the locking member includes a washer through which the operating member may be inserted.

10. A power tool as claimed in claim 9 in which the washer has at least one slot for receiving a projection on the operating member whereby the operating member is captured on rotation of the washer.

11. A power tool as claimed in claim 10 in which the washer further has at least one cam surface for driving the operating member into the tool on rotation of the washer.

12. A power tool as claimed in claim 11, wherein the washer has two cam surfaces each of which engages with a different projection of the operating member.

13. A power tool as claimed in claim 12, wherein the two cam surfaces each engage with their associated projection at a different angular orientation of the washer.

* * * * *